Jan. 1, 1929.
E. WANDERSLEB ET AL
PHOTOGRAPHIC LENS
Filed July 8, 1926

1,697,670

Fig. 1

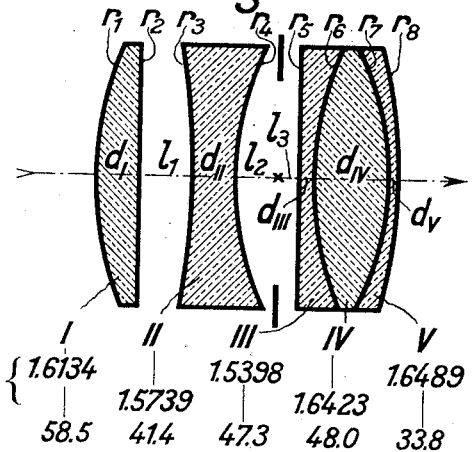

$r_1 = +33.04$
$r_2 = \pm \infty$
$r_3 = -72.95$
$r_4 = +29.96$
$r_5 = \pm \infty$
$r_6 = +31.94$
$r_7 = -27.61$
$r_8 = -49.19$ $d_I = 4.66$
$l_1 = 5.44$
$d_{II} = 3.88$
$l_2 = 4.57$
$l_3 = 1.98$
$d_{III} = 1.55$
$d_{IV} = 7.77$
$d_V = 0.86$

| | I | II | III | IV | V |
|---|---|---|---|---|---|
| $n_D =$ | 1.6134 | 1.5739 | 1.5398 | 1.6423 | 1.6489 |
| $\nu =$ | 58.5 | 41.4 | 47.3 | 48.0 | 33.8 |

Fig. 2

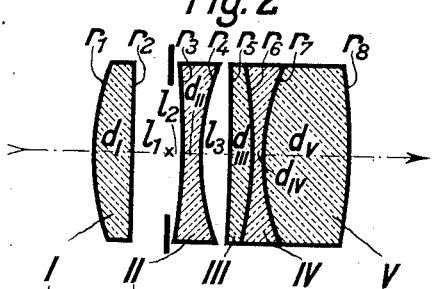

$r_1 = +25.49$
$r_2 = \pm \infty$
$r_3 = -69.28$
$r_4 = +23.88$
$r_5 = -937.8$
$r_6 = -43.67$
$r_7 = +21.66$
$r_8 = -52.35$ $d_I = 4.15$
$l_1 = 3.64$
$l_2 = 1.09$
$d_{II} = 2.18$
$l_3 = 2.56$
$d_{III} = 2.55$
$d_{IV} = 1.09$
$d_V = 8.73$

| | I | II | III | IV | V |
|---|---|---|---|---|---|
| $n_D =$ | 1.5163 | 1.5474 | 1.6230 | 1.5243 | 1.6230 |
| $\nu =$ | 64.0 | 45.9 | 56.9 | 51.6 | 56.9 |

Fig. 3

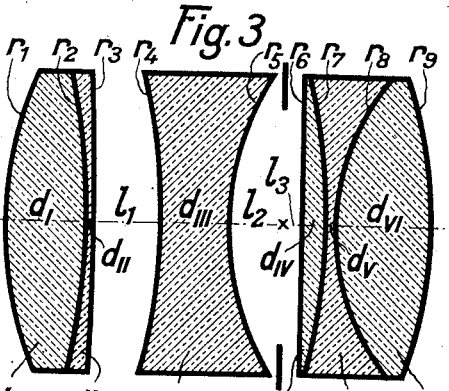

$r_1 = +38.24$
$r_2 = -68.95$
$r_3 = -1369.7$
$r_4 = -60.61$
$r_5 = +28.64$
$r_6 = \pm \infty$
$r_7 = -61.73$
$r_8 = +23.57$
$r_9 = -45.09$ $d_I = 8.55$
$d_{II} = 0.58$
$l_1 = 6.87$
$d_{III} = 6.55$
$l_2 = 5.45$
$l_3 = 1.77$
$d_{IV} = 2.73$
$d_V = 0.72$
$d_{VI} = 9.82$

| | I | II | III | IV | V | VI |
|---|---|---|---|---|---|---|
| $n_D =$ | 1.6238 | 1.5475 | 1.5829 | 1.6424 | 1.5399 | 1.6221 |
| $\nu =$ | 56.9 | 45.9 | 40.5 | 48.0 | 47.4 | 53.15 |

Focal length: 100.

Inventors:

Patented Jan. 1, 1929.

1,697,670

UNITED STATES PATENT OFFICE.

ERNST WANDERSLEB AND WILLY MERTÉ, OF JENA, GERMANY, ASSIGNORS TO THE FIRM CARL ZEISS, OF JENA, GERMANY.

PHOTOGRAPHIC LENS.

Application filed July 8, 1926, Serial No. 121,255, and in Germany August 6, 1925.

The present invention relates to a lens for photography and projection, corrected spherically, chromatically, astigmatically and for coma, and consisting of three parts, viz, an isolated, dispersive part and two collective parts embracing the same, and in which lens one of the collective parts is, in addition, composed of three members cemented together. Of this particular kind of triple photographic lenses such have become known already in which the last-mentioned collective part is so composed that a collective meniscus is embraced by a dispersive and a collective member, as well as such lenses in which this collective part consists of a middle biconcave member and of two collective members embracing the same.

According to the present invention one obtains a photographic lens of particularly good, optical properties by rendering collective, the cemented surface next to the isolated, dispersive part and by thereby rendering of the middle one of the three members cemented to each other the one of the two radii according to its absolute value not greater than the tenfold of the other. In the well-known sub-species of the present lenses, mentioned above in the last place, the respective cemented surface has dispersive power. The effect aimed at is obtained by the above named means as well in the case in which the said collective part is composed of a collective meniscus located between a dispersive and a collective member as in the case in which it is composed of a biconvex member between two dispersive members.

By rendering biconcave the middle member in the repeatedly mentioned triple, collective part, it is suitable to render collective both cemented surfaces of this part.

Furthermore, in order to increase the optical capacity it has proved suitable to make the second, collective part of the photographic lens of two members cemented together and at the same time to make the cemented surface collective.

The annexed drawing and the subjoined tables show three constructional examples according to the invention, of which the first (Fig. 1) contains a collective part with a biconvex member between two dispersive members and of which the two others (Figs. 2 and 3) contain a collective part with a biconcave member between two collective members. The subjoined particulars relate to a total focal length of 100 for each of the photographic lenses.

1. Example. (Fig. 1.)

| Radii. | Thicknesses and distances. |
|---|---|
| $r_1 = +33.04$ | $d_1 = 4.66$ |
| $r_2 = \pm \infty$ | $l_1 = 5.44$ |
| $r_3 = -72.95$ | $d_{II} = 3.88$ |
| $r_4 = +29.96$ | $l_2 = 4.57$ |
| $r_5 = \pm \infty$ | $l_3 = 1.98$ |
| $r_6 = +31.94$ | $d_{III} = 1.55$ |
| $r_7 = -27.61$ | $d_{IV} = 7.77$ |
| $r_8 = -49.19$ | $d_V = 0.86$ |

Aperture-ratio 1 : 3.5.

KINDS OF GLASS.

| | I | II | III | IV | V |
|---|---|---|---|---|---|
| $n_D =$ | 1.6134 | 1.5739 | 1.5398 | 1.6423 | 1.6489 |
| $\nu =$ | 58.5 | 41.4 | 47.3 | 48.0 | 33.8 |

2. Example. (Fig. 2.)

Radii.
$r_1 = + 25.49$
$r_2 = \pm \infty$
$r_3 = - 69.28$
$r_4 = + 23.88$
$r_5 = -937.8$
$r_6 = - 43.67$
$r_7 = + 21.66$
$r_8 = - 52.35$ Thicknesses and distances.
$d_I = 4.15$
$l_1 = 3.64$
$l_2 = 1.09$
$d_{II} = 2.18$
$l_3 = 2.56$
$d_{III} = 2.55$
$d_{IV} = 1.09$
$d_V = 8.73$ Aperture-ratio = 1:4.

KINDS OF GLASS.

|   | I | II | III | IV | V |
|---|---|---|---|---|---|
| $n_D =$ | 1.5163 | 1.5474 | 1.6230 | 1.5243 | 1.6230 |
| $\nu =$ | 64.0 | 45.9 | 56.9 | 51.6 | 56.9 |

3. Example. (Fig. 3.)

Radii.
$r_1 = + 38.24$
$r_2 = - 68.95$
$r_3 = -1369.7$
$r_4 = - 60.61$
$r_5 = + 28.64$
$r_6 = \pm \infty$
$r_7 = - 61.73$
$r_8 = + 23.57$
$r_9 = - 45.09$ Thicknesses and distances.
$d_I = 8.55$
$d_{II} = 0.58$
$l_1 = 6.87$
$d_{III} = 6.55$
$l_2 = 5.45$
$l_3 = 1.77$
$d_{IV} = 2.73$
$d_V = 0.72$
$d_{VI} = 9.82$ Aperture-ratio 1:2.7.

KINDS OF GLASS.

|   | I | II | III | IV | V | VI |
|---|---|---|---|---|---|---|
| $n_D =$ | 1.6238 | 1.5475 | 1.5829 | 1.6424 | 1.5399 | 1.6221 |
| $\nu =$ | 56.9 | 45.9 | 40.5 | 48.0 | 47.4 | 53.15 |

We claim:

1. Photographic lens corrected spherically, chromatically, astigmatically and for coma, consisting of an isolated, dispersive part and two collective parts embracing the same, of which latter the one again consists of three members cemented together, of which the middle one is delimited by surfaces having radii of curvature of different sign, the one of these radii being with its absolute value not greater than the tenfold of the other, which middle member has a refractive power differing according to its sign from the refractive powers of the two members embracing it, the one of the two cemented surfaces, next to the said dispersive part, of the said triple part having collective power.

2. Photographic lens according to claim 1, in which the middle member of the said triple part is biconcave and both the said cemented surfaces have collective power.

3. Photographic lens according to claim 1, in which the second of the said collective parts consists of two members together and the cemented surface has collective power.

ERNST WANDERSLEB.
WILLY MERTÉ.